(12) United States Patent
Hong et al.

(10) Patent No.: US 6,278,248 B1
(45) Date of Patent: Aug. 21, 2001

(54) BRUSHLESS DC MOTOR FAN DRIVEN BY AN AC POWER SOURCE

(75) Inventors: Yin Rong Hong; Alex Horng, both of Kaohsiung (TW)

(73) Assignee: Sunonwealth Electric Machine Industry Co., Ltd. (TW)

( * ) Notice: Subject to any disclaimer, the term of this patent is extended or adjusted under 35 U.S.C. 154(b) by 0 days.

(21) Appl. No.: 09/473,695

(22) Filed: Dec. 29, 1999

(30) Foreign Application Priority Data

Sep. 10, 1999 (TW) .............................................. 88215759 U
Oct. 8, 1999 (TW) .............................................. 88217298 U

(51) Int. Cl.[7] ................. H02K 9/06; H02P 6/08
(52) U.S. Cl. ............................................ 318/254; 310/63
(58) Field of Search ................................ 318/138, 254, 318/439; 310/52, 62, 63; 323/247, 265, 293, 355, 363, 364, 365

(56) References Cited

U.S. PATENT DOCUMENTS

| | | | |
|---|---|---|---|
| 4,554,491 | * | 11/1985 | Plunkett ................................ 318/254 |
| 4,620,139 | * | 10/1986 | Egami et al. .......................... 318/254 |
| 4,804,873 | * | 2/1989 | Shiraki et al. ...................... 310/67 R |
| 4,832,576 | * | 5/1989 | Deguchi et al. ........................ 417/45 |
| 4,891,537 | * | 1/1990 | Shiraki et al. ...................... 310/68 B |
| 5,099,181 | * | 3/1992 | Canon .................................. 318/254 |
| 5,598,073 | * | 1/1997 | Hans et al. ............................. 318/431 |

OTHER PUBLICATIONS

Sedra et al. "Microelectronic Circuits." Fourth Edition, p. 202. Oxford University Press, 1998.*

* cited by examiner

*Primary Examiner*—Bentsu Ro
(74) *Attorney, Agent, or Firm*—Bacon & Thomas

(57) ABSTRACT

A brushless DC motor fan includes a rotor, a stator, a drive circuit, and a conversion circuit. An input of the conversion circuit is connected to an AC power source. The conversion circuit drops the voltage of the AC power source before connecting to a sensor element and a drive circuit. The drive circuit outputs alternately conducted current with positive/negative polarity to make the coil of the stator be alternately conducted, thereby generating an alternating magnetic field for driving the rotor.

18 Claims, 7 Drawing Sheets

BRUSHLESS DC MOTOR FAN DRIVEN BY AN AC POWER SOURCE

BACKGROUND OF THE INVENTION

1. Field of the Invention

The present invention relates to a brushless direct-current (DC) motor fan that can be driven by an alternating-current (AC) power source.

2. Description of the Related Art

With technology advance, current brushless direct current motor fans can be mass-production in miniature size, light, weight, and compact with stable quality. Although widely used, they are still not suitable for household use, as they can not be driven by alternating current power sources which is available at ordinary house.

SUMMARY OF THE INVENTION

It is a primary object of the present invention to provide a brushless DC motor fan that is not limited to be driven by direct current such that miniature brushless DC motor can be widely and conveniently used.

A brushless DC motor fan in accordance with the present invention includes a conversion circuit for converting alternating current for connection with a sensor element and a drive circuit. Thus, the drive circuit allows the current of the motor coil to be alternately conducted with positive/negative polarity, thereby generating an alternating magnetic field which interact with a permanent magnet of the rotor and cause the motor to rotate.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Figure 1:
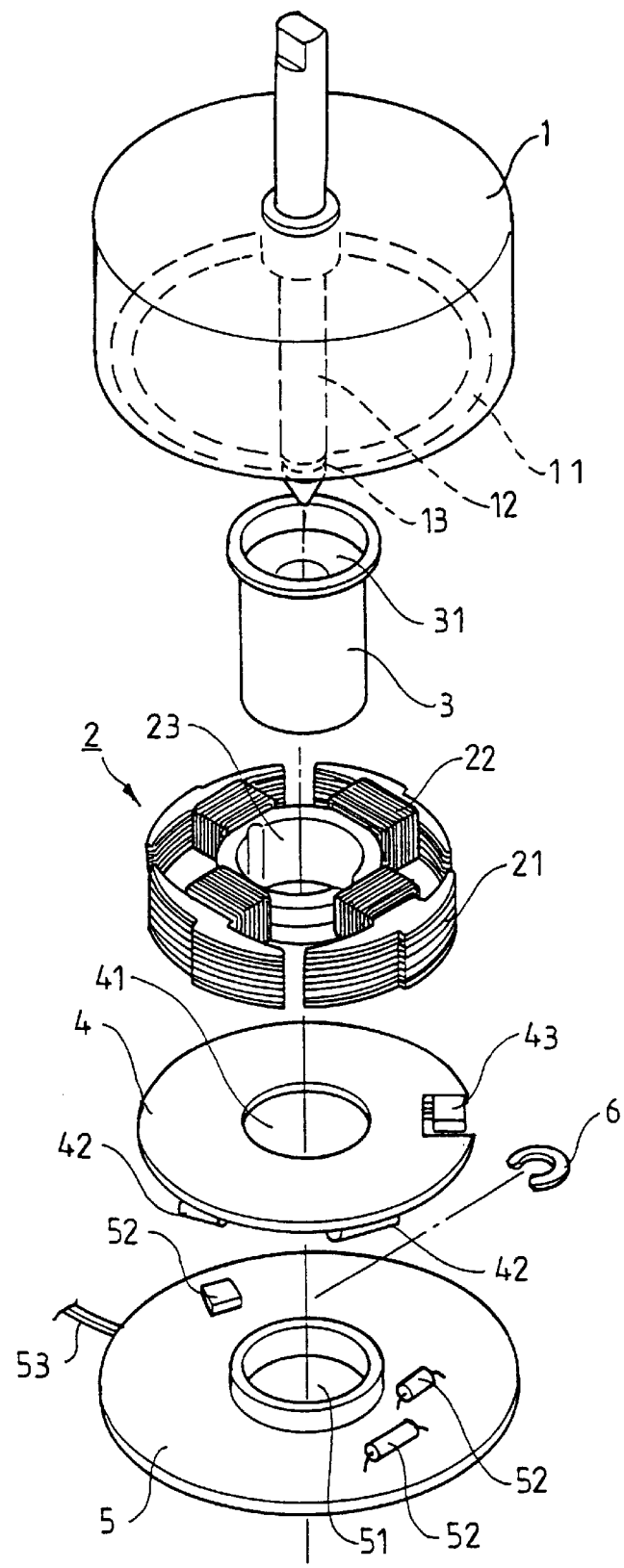
FIG. 1 is an exploded perspective view of a first embodiment of a brushless DC motor in accordance with the present invention.

Referring to FIG. 1, a first embodiment of a brushless DC motor in accordance with the present invention generally includes a rotor 1, a stator 2, an axle tube 3, a drive circuit board 4, and a fixed plate 5.

The rotor 1 includes an annular permanent magnet 11 with more than one set of north pole and south pole. The permanent magnet 11 is around the stator 2 for induction purpose. The rotor 1 includes a shaft 12 that is pivotally mounted in a bearing 31 provided in the axle tube 3. The rotor 1 may include blades to form an impeller. Alternatively, the shaft 12 may include an impeller attached to an end thereof. The shaft 12 includes an annular groove 13 in the other end thereof for engaging with a retainer element 6 (e.g., a C-clip), thereby retaining the shaft 12 in place.

The stator 2 includes pole plates 21 with coil 22 wound around pole posts (not labeled). The stator 2 includes a central hole 23 which the axle tube 3 extends. Thus, the stator 2 is engaged with the rotor 3. The coil 22 of the stator 2 is electrically connected to and thus controlled by a drive circuit on the drive circuit board 4.

The axle tube 3 is extended through the hole 23 of the stator 2, a hole 41 in the drive circuit board 4, and engaged in a hub 51 on the fixed plate 5. The bearing 31 is mounted in the axle tube for pivotally supporting the shaft 12 of the rotor 1. The axle tube 3 and the hub 51 on the fixed plate 5 may be integrally formed if desired.

In addition to the hole 41 for mounting the axle tube 3, the drive circuit board 4 includes necessary electric elements 42 to constitute a drive circuit. The drive circuit board 4 further includes a sensor element 43 to detect polarity of the permanent magnet 11 for producing a pulse signal, thereby allowing the drive circuit to output alternating current with positive/negative polarity to the coil 22 of the stator 2 for generating alternating magnet IC fields to drive the rotor 1.

In addition to the hub 51 for mounting the axle tube 3, the fixed plate 5 includes necessary electric elements 52 to constitute a conversion circuit. The fixed plate 5 has a power line 53 that acts as an input for the conversion circuit. The power line 53 may be electrically connected to a household alternating current power source. An output of the conversion circuit is electrically connected to the drive circuit of the drive circuit board 4. Preferably, the fixed plate 5 is integral with the housing of the fan or motor.

Figure 2:
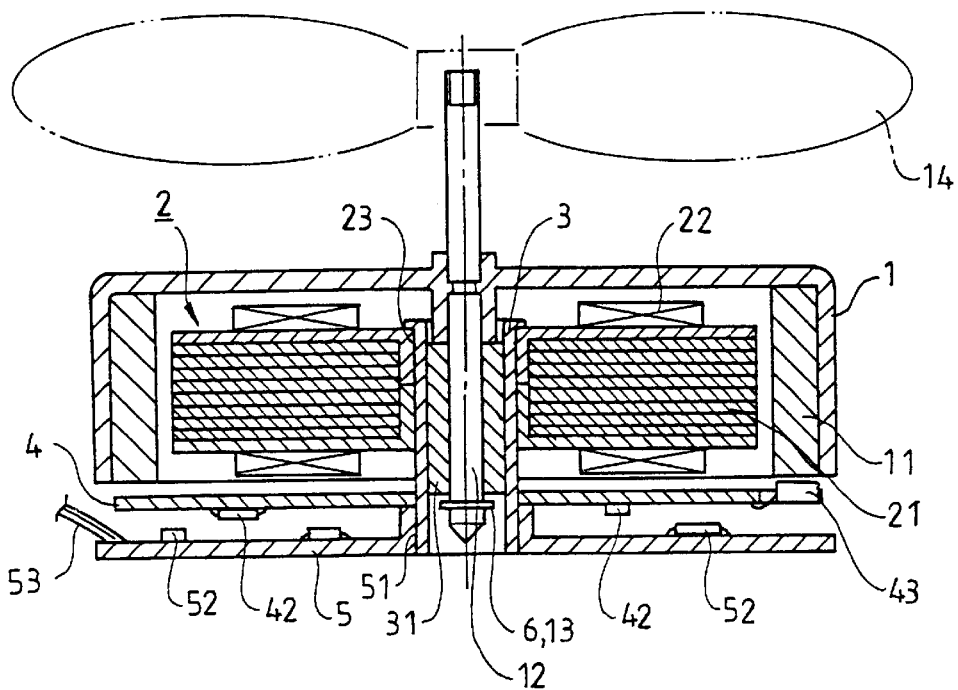
FIG. 2 is a sectional view of the motor in FIG. 1.

Referring to FIG. 2, a section view of assembly of the first embodiment in accordance with the present invention, the axle tube 3 is extended through the stator 2 and the drive circuit board 4 and engaged on the fixed plate 5. The bearing 31 is mount inside axle tube 3. The bore of bearing 31 receives the shaft 12 which is retained in place by the retainer element 6 engaged in the annular groove 13 of the shaft 12. The rotor 1 and the stator 2 are thus engaged together. The permanent magnet 11 of the rotor 1 is around the stator 2 such that the rotor 1 is rotatable relative to the stator as a result of magnetic induction. The shaft 12 may be engaged with an impeller 14 such that the impeller 14 may rotate together with the rotor 1. Alternatively, the rotor I may include blades to form an impeller, as mentioned above.

Figure 3:
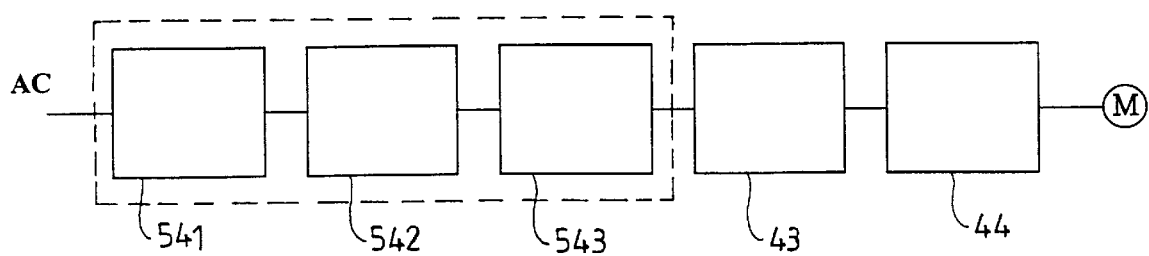
FIG. 3 is a block diagram of a circuit for the motor in FIG. 1.
Figure 4:
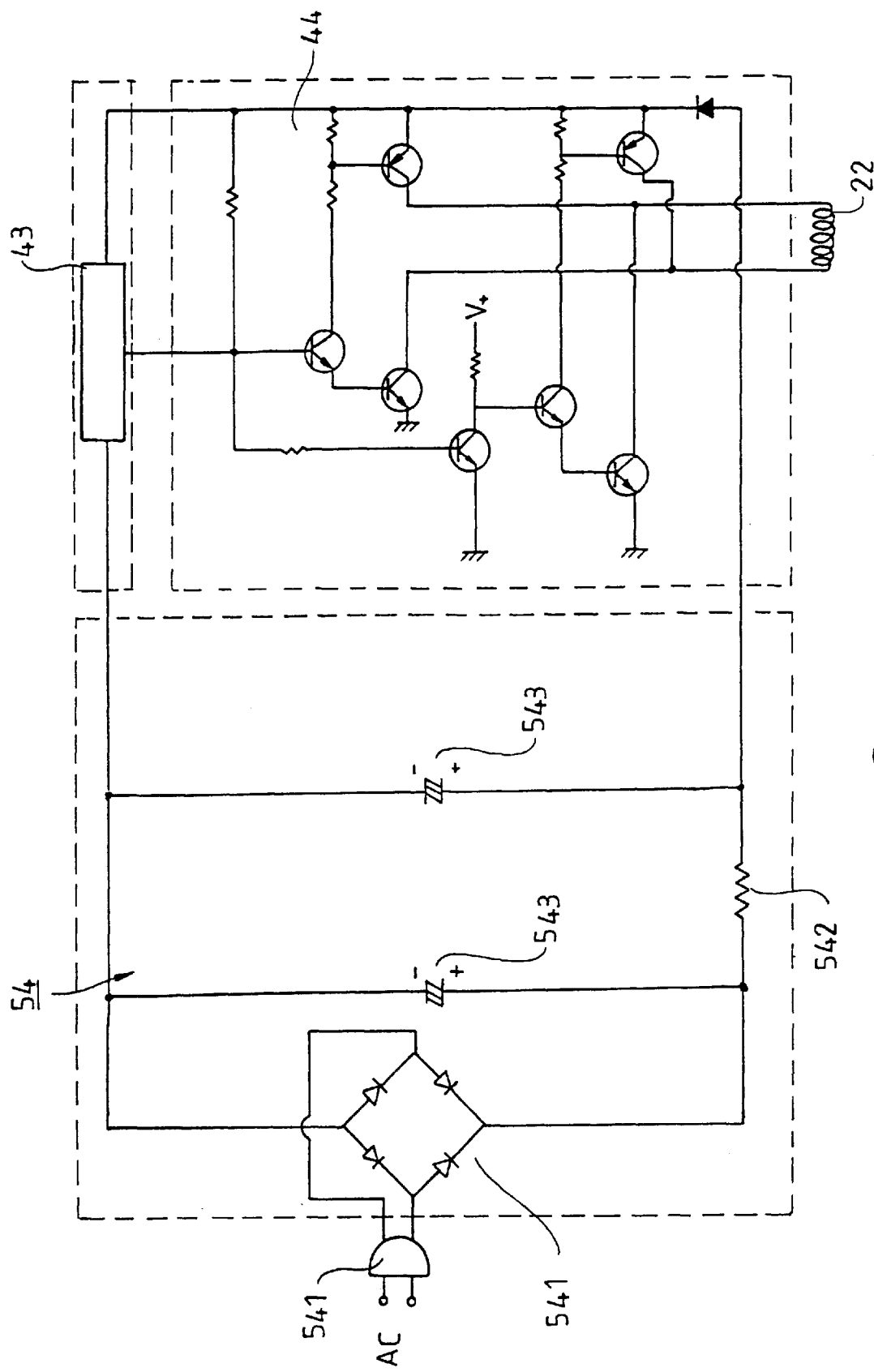
FIG. 4 is a schematic diagram of the circuit for the motor, illustrating detailed conversion circuit.

FIGS. 3 and 4 illustrate block diagram and detailed schematic diagram of a circuit in accordance with the present invention, respectively. The circuit includes a conversion circuit 54, a sensor element 43, and a drive circuit 44. The conversion circuit 54 includes a rectifier element 541, a voltage-dropping element 542, and a filter element 543.

Alternating current is rectified by the rectifier element 541 and then dropped in voltage by the voltage-dropping element 542. The voltage waveforms are filtered and regulated by the filter element 543 to form a direct current power source with lower voltage. The direct current power source is electrically connected to the sensor element 43 and the drive circuit 44. The drive circuit 44 cooperates with the sensor element 43 that detects polar change of the permanent magnet 11 of the rotor 1 to thereby provide alternately conducted current with positive/negative polarity to the coil 22. Alternating magnetic field is thus formed to turn the rotor 1.

Furthermore, the conversion circuit 54 and the drive circuit 44 may be made in an integrated circuit chip separately or together to thereby further minimize the overall size of the brushless DC motor and to thereby allow easier and simpler assembly and manufacture.

Figure 5:
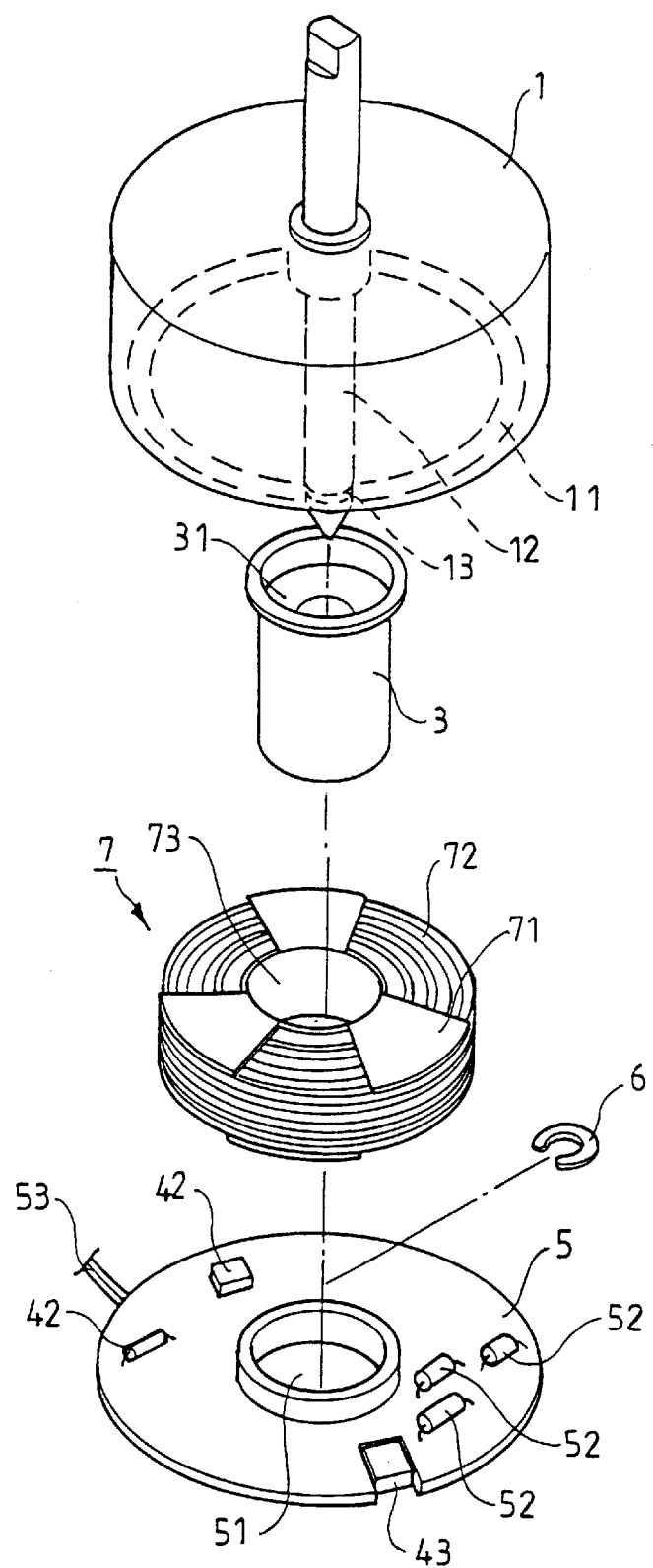
FIG. 5 is an exploded perspective view of a second embodiment of the brushless DC motor in accordance with the present invention.

FIG. 5 illustrates a second embodiment of the brushless DC motor of the invention. The stator (now designated by 7) is different from that in the first embodiment, and the drive circuit board 4 has been omitted. As illustrated in FIG. 5, the stator 7 includes pole plates 71 and coil 72, wherein the coil 72 is a single winding axially wound between upper and lower pole plates 71. The coil 22 of the stator 2 in the first embodiment is radially wound around pole posts of the pole plates 21. Thus, the stator 7 in the second embodiment can be manufactured in an easier manner. In addition, the drive circuit board 4 has been omitted, and the sensor element 43 and the drive circuit 44 are mounted on the fixed plate 5. The fixed plate 5 may be integral with the housing of the fan or motor.

Figure 6:
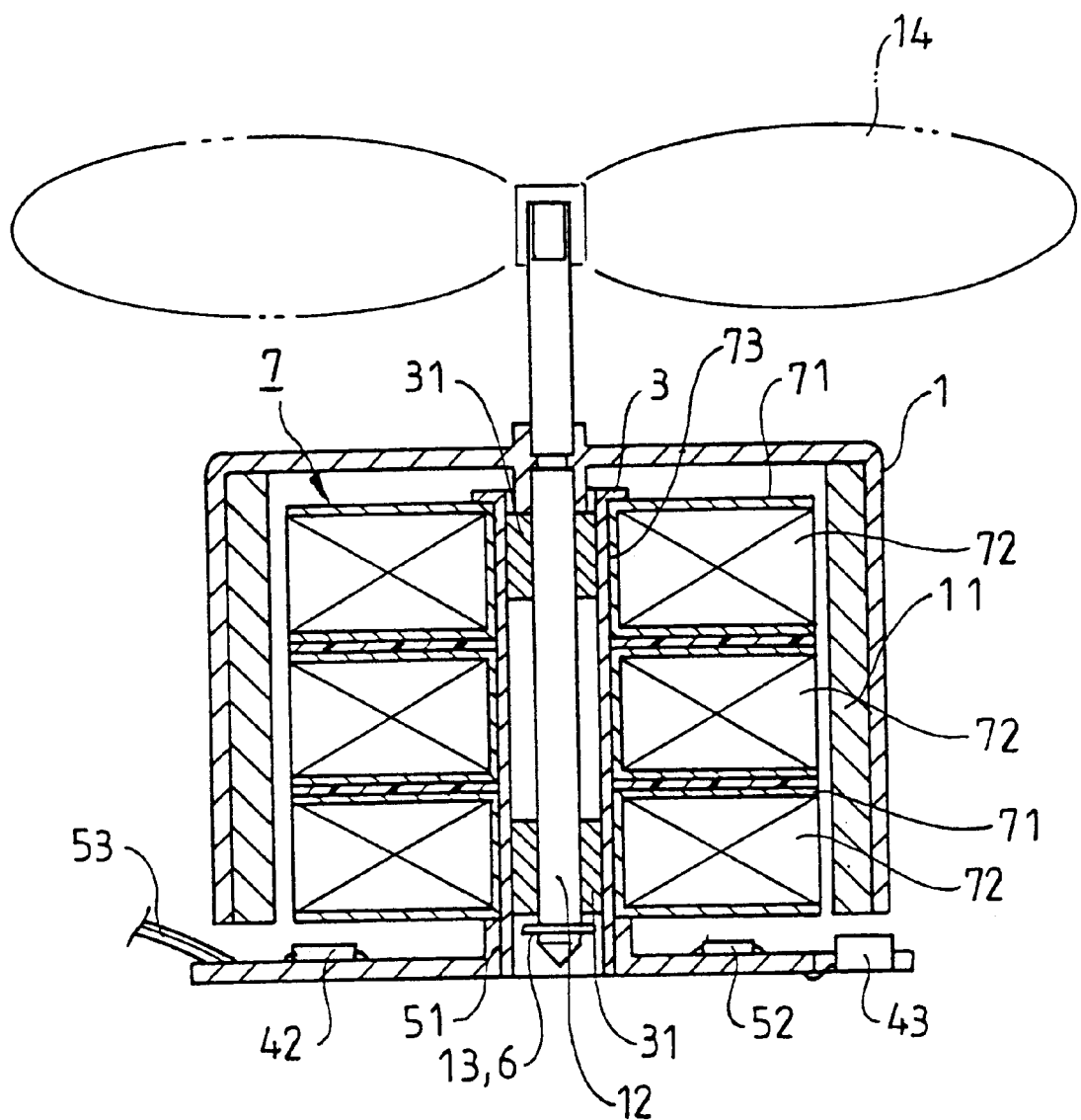
FIG. 6 is a sectional view of the motor fan in FIG. 5.

FIG. 6 illustrates a third embodiment of the brushless DC motor of the invention. When a brushless DC motor requires a higher torque output, the motor may include more than one stator 7 mounted on the axle tube 3 in series and more than one sensor element for detection Thus a brushless DC motor with a higher torque output is former as illustrated in FIG. 6.

Figure 7:
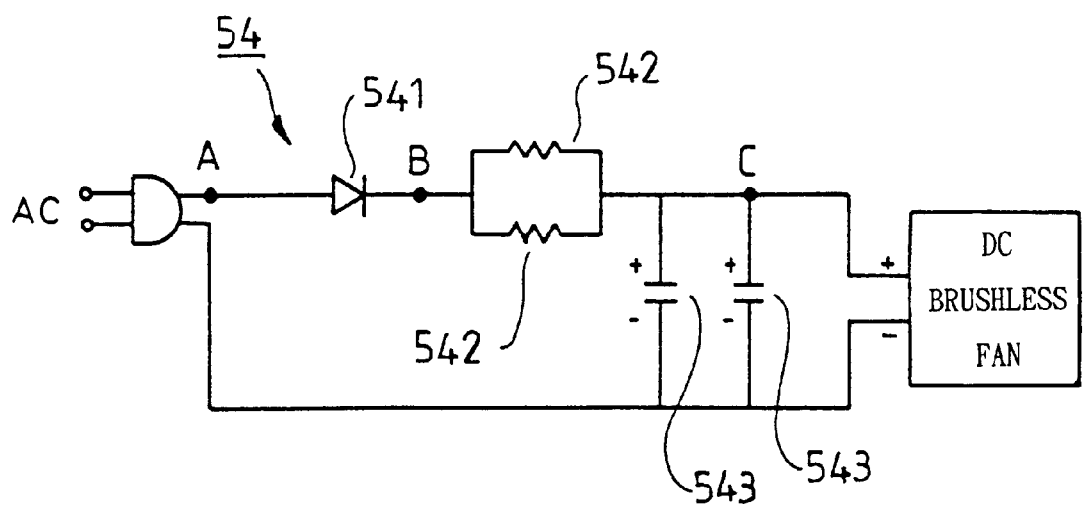
FIG. 7 is a second embodiment of the conversion circuit in accordance with the present invention.

FIG. 7 illustrates a second embodiment of the conversion circuit 54 in accordance with the present invention, wherein a diode is connected to the AC power source in series to form the rectifier element 541 for proceeding with half-wave rectification on the alternating current A voltage-dropping element 542 consisting of a set of resistors that are connected in parallel is then connected in series for dropping voltage, and a filter element 543 consisting of at least one filtering capacitor is connected in parallel, thereby forming a DC voltage for driving the brushless DC motor fan.

Figure 8:
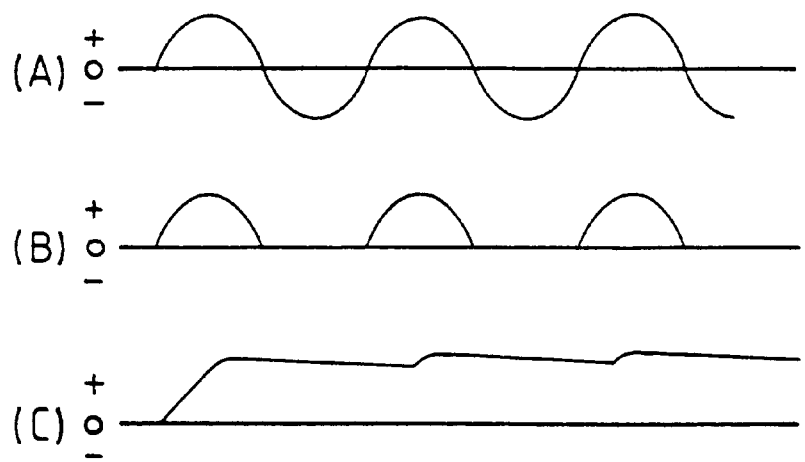
FIG. 8a is a voltage waveform diagram of point A in FIG. 7.
FIG. 8b is a voltage waveform diagram of point B in FIG. 7.
FIG. 8c is a voltage waveform diagram of point C in FIG. 7.

FIG. 8a is a voltage waveform diagram of point A in FIG. 7, FIG. 8b is a voltage waveform diagram of point B in FIG. 7, and FIG. 8c is a voltage waveform diagram of point C in FIG. 7. Voltage waveform of the AC power source at point A is represented in FIG. 8a. After rectification by the rectifier element 541 (the diode), the voltage waveform at point B is represented in FIG. 8b. After filtering and regulation by the filter element 543, the voltage waveform at Point C is represented in FIG. 8c. As can be seen from FIGS. 8a through 8c, the AC power source, after passing through the conversion circuit 54, is converted into a reliable DC power source for driving the brushless DC motor fan.

Figure 9:
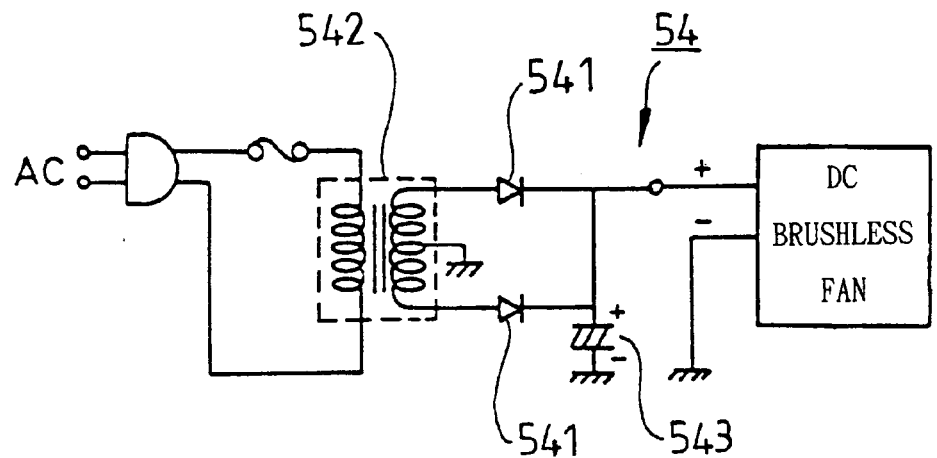
FIG. 9 is a third embodiment of the conversion circuit in accordance with the present invention.

FIG. 9 illustrates a third embodiment of the conversion circuit 54 in accordance with the present invention. The voltage-dropping element 542 of the conversion circuit 54 in this embodiment is in the form of a transformer. The AC power source after voltage drop is rectified by the rectifier element 541 and then finally filtered and regulated by the filter capacitor 543 for regulating the voltage waveform. A reliable DC power source is thus obtained for driving the brushless DC motor fan.

Figure 10:
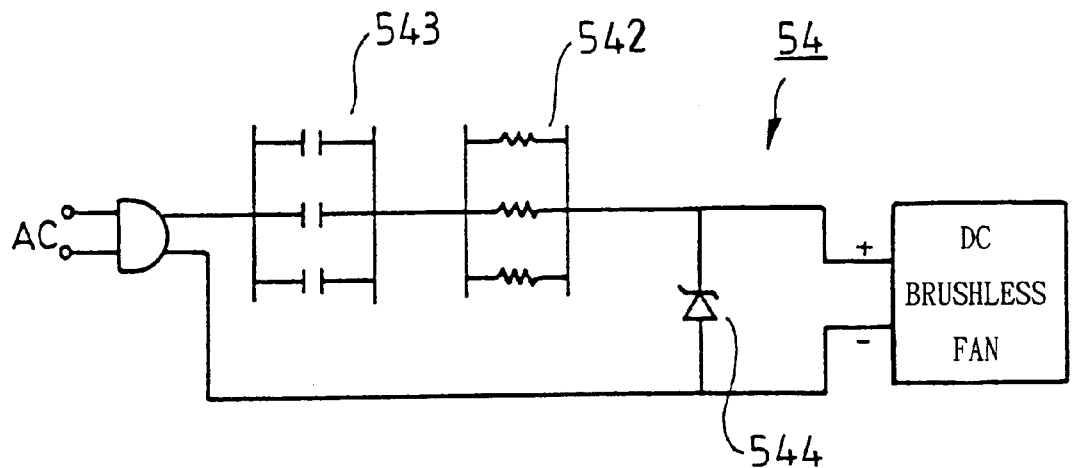
FIG. 10 is a fourth embodiment of the conversion circuit in accordance with the present invention.

FIG. 10 illustrates a fourth embodiment of the conversion circuit 54 in accordance with the present invention. In this embodiment, the filter element 543 of the conversion circuit 54 consists of a set of capacitors connected in parallel for filtering the alternating current. The filter element 543 is connected in series with a voltage dropping element 542 consisting of a set of resistors connected in parallel for voltage dropping. At last, a Zener diode 544 is used to regulate the voltage to a stable DC power source for driving the brushless DC motor fan.

According to the above description, the brushless DC motor in accordance with the present invention can be directly driven by alternating current to allow wider application and to solve the inconvenience of power source to conventional brushless DC motors.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. A brushless direct current motor fan driven by an alternating current power source, the brushless direct current motor fan comprising:

a rotor including a shaft rod and a rotor permanent magnet with at least one set of north pole and south pole;

a stator including a plurality of pole plates and a coil, the stator including a central hole, for an axle tube to be sleeved on;

an axle tube, a bearing mounted inside for pivotally supporting a shaft, the axle tube being extended through the central hole of the stator;

a drive circuit board including a sensor element and a plurality of electric elements to constitute a drive circuit; and a fixed plate including a plurality of electric elements mounted thereon to constitute a conversion circuit and including a power line adapted to be electrically connected to the alternating current power source;

the alternating current being converted into a direct current power source after rectification, filtering and regulation by the conversion circuit, the direct current power source driving the drive circuit and cooperating with the sensor element that detects a change in polarity of the permanent magnet to thereby provide alternately conducted current with positive/negative polarity to the coil of the stator, thereby generating an alternating magnetic field for driving the rotor.

2. The brushless direct current motor fan as claimed in claim 1, wherein the shaft of the rotor includes an annular groove defined in an end thereof, further comprising a retainer element engaged in the annular groove for retaining the shaft of the rotor in place, the rotor pivotally supported by the shaft which is received in the bearing.

3. The brushless direct current motor fan as claimed in claim 2, wherein the shaft of the rotor includes an impeller formed on the other end without annular groove thereof to rotate together with the rotor.

4. The brushless direct current motor fan as claimed in claim 1, wherein the rotor includes a plurality of blades to form an impeller.

5. The brushless direct current motor fan as claimed in claim 1, wherein the fixed plate includes a hub for securely mounting the axle tube.

6. The brushless direct current motor fan as claimed in claim 5, wherein the hub of the fixed plate and the axle tube are integrally formed in one piece.

7. The brushless direct current motor fan as claimed in claim 1, wherein the motor fan includes a housing that is integral with the fixed plate in one piece.

8. The brushless direct current motor fan as claimed in claim 1, wherein more than two sets of stators mounted therearound the axle tube and connected in series.

9. The brushless direct current motor fan as claimed in claim 8, wherein the drive circuit includes more than one said sensor element.

10. A brushless direct current motor fan driven by an alternating current power source, the brushless direct current motor fan comprising:

a rotor including a shaft and a rotor permanent magnet with at least one set of north pole and south pole;

a stator including a plurality of pole plates and a coil, the stator including a central hole for an axle tube to be sleeved on;

an axle tube, a bearing mounted inside for pivotally supporting a shaft, the axle tube being extended through the central hole of the stator;

a sensor element for detecting a change in polarity of the permanent magnet of the rotor and sending a pulse signal in response thereto;

a drive circuit including an output connected to the coil of the stator, the drive circuit receiving the pulse signal from the sensor element and providing alternately conducted current with positive/negative polarity to the coil, thereby generating an alternating magnetic field to drive the rotor; and a conversion circuit including an input adapted to be electrically connected to the alternating current power source, the alternating current being converted into a direct current power source after half-wave or full wave rectification by the conversion circuit and then filtered by the conversion circuit to output a direct current power source that is electrically connected to the sensor element and the driving circuit.

11. The brushless direct current motor fan as claimed in claim 10, wherein the shaft of the rotor includes an annular groove defined in an end thereof, further comprising a retainer element engaged in the annular groove for retaining the shaft of the rotor in place, the rotor pivotally supported by the shaft which is received in the bearing.

12. The brushless direct current motor fan as claimed in claim 11, wherein the shaft of the rotor includes an impeller formed on the other end without annular groove thereof to rotate together with the rotor.

13. The brushless direct current motor fan as claimed in claim 10, wherein the rotor includes a plurality of blades to form an impeller.

14. The brushless direct current motor fan as claimed in claim 10, wherein more than two sets of stators mounted therearound the axle tube and connected in series.

15. The brushless direct current motor fan as claimed in claim 14, wherein the drive circuit includes more than one said sensor element.

16. The brushless direct current motor fan as claimed in claim 10, wherein the drive circuit is designed to be in an integrated circuit chip.

17. The brushless direct current motor fan as claimed in claim 10, wherein the conversion circuit is designed to be in an integrated circuit chip.

18. The brushless direct current motor fan as claimed in claim 10, wherein the drive circuit and the conversion circuit are designed together to be in the form of an integrated circuit chip.

* * * * *